United States Patent [19]
Kehr

[11] 3,876,606
[45] Apr. 8, 1975

[54] THERMOSETTING EPOXY RESIN POWDER HIGHLY FILLED WITH BARIUM SULFATE, CALCIUM CARBONATE AND MICA

[75] Inventor: John Alan Kehr, St. Paul, Minn.

[73] Assignee: Minnesota Mining and Manufacturing Company, St. Paul, Minn.

[22] Filed: June 14, 1973

[21] Appl. No.: 369,807

[52] U.S. Cl.......................... 260/37 EP; 117/132 BE
[51] Int. Cl............................................. C08g 51/04
[58] Field of Search ................................ 260/37 EP

[56] References Cited
UNITED STATES PATENTS

| | | | |
|---|---|---|---|
| 3,102,043 | 8/1963 | Winthrop et al. | 260/37 EP X |
| 3,578,615 | 5/1971 | Moore et al. | 260/37 EP X |

OTHER PUBLICATIONS

Lee et al.; Handbook of Epoxy Resins; McGraw-Hill Book Co., 1967, pp. 14–10 and 14–11, Sci. Lib., Tp 1180.E6 L4.

Primary Examiner—Lewis T. Jacobs
Attorney, Agent, or Firm—Alexander, Sell, Steldt & DeLaHunt

[57] ABSTRACT

15–30 volume percent of a thermosetting epoxy resin powder comprising a polyglycidyl ether of polyhydric phenol and a dihydrazide hardener is barium sulfate and/or calcium carbonate filler. Up to one-third by volume of said filler may be replaced by mica. Subsurface pipe coated with this powder is especially useful for conveying hot liquids.

7 Claims, No Drawings

THERMOSETTING EPOXY RESIN POWDER HIGHLY FILLED WITH BARIUM SULFATE, CALCIUM CARBONATE AND MICA

FIELD OF THE INVENTION

The invention concerns thermosetting epoxy resin powders for coating metal articles, especially for pipelines buried in the ground or submerged in water.

BACKGROUND OF THE INVENTION

Thermosetting epoxy resin powders are widely used to provide corrosion-resistant coatings, especially for subsurface pipelines. The coatings may be applied by blowing the powder onto steel pipe which has been preheated to a temperature above the softening point of the powder so that the powder fuses and adheres to the pipe. The pipe may then be carried to an oven to cure the resin, or if the pipe contains sufficient heat, the resin will be fully cured before the pipe has cooled to room temperature.

While these protective coatings tenaciously adhere to the pipe when first cured, they tend to be subject to disbondment within a short time when buried in moist ground and used to convey hot liquid. Another cause of disbondment of the coatings is the cathodic protection which is commonly applied to buried pipe, a condition which is aggravated in hot service.

Of pipe coatings used in the prior art, that which may best resist disbondment is provided by Example 4 of U.S. Pat. No. 3,102,043. The powder of that example was sold as "Scotchkote" 101 powdered resin by the company to which the present application is assigned. Unfortunately, coated pipe is often handled roughly. Because coatings of that powder would not withstand rough treatment, the "Scotchkote" 101 resin is little used as a pipe coating. Other epoxy resin powders such as those of other examples of U.S. Pat. No. 3,102,043 provide better resistance to impact and bending, albeit less resistance to disbondment. These differences may be due in part to the high proportion of mica powder in the composition of Example 4 (22.5% by volume) as compared to little or no filler of any kind in the other examples of U.S. Pat. No. 3,102,043 and in part to the dihydrazide hardening agent.

U.S. Pat. No. 3,578,615, at column 8, lines 61 et seq., suggests that mica powder significantly improves the resistance of epoxy resin coatings to cathodic disbondment and is better in this respect than other fillers. Earlier in column 8, this patent says that outstanding resistance to cathodic disbondment is imparted by certain additives such as barium chromate, lead silicochromate and barium sulfate (barytes). Tables I and III of the patent class these additives as fillers and indicate that these additives provide less resistance to cathodic disbondment than does mica. U.S. Pat. No. 3,578,615 does not discuss flexibility or resistance to impact.

The above-discussed prior art taken together seems to indicate that certain fillers, especially mica powder, improve resistance to disbondment of cured epoxy resin coatings, but at the expense of toughness or resistance to impact and bending.

THE PRESENT INVENTION

The epoxy resin composition of the present invention can be pulverized to provide a free-flowing powder which is shelf-stable for many months at room temperature and provides heat-cured coatings which have the necessary toughness and flexibility to withstand rough treatment and at the same time exhibit exceedingly good resistance to disbondment. Because pieces of steel having heat-cured coatings of the present invention withstand boiling water indefinitely without any evidence of disbondment, buried pipe coated with the novel epoxy resin composition should be especially useful for conveying hot liquids.

The novel epoxy resin composition is similar to that of Example 4 of U.S. Pat. No. 3,102,043 in that it is based on a polyglycidyl ether of polyhydric phenol such as bisphenol A having a softening point of 70°–120°C and a hardening agent comprising 0.6–1.5 equivalents (0.15–0.375 mole) per epoxide equivalent of the polyglycidyl ether of a dihydrazide of the formula

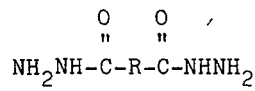

where R is a divalent hydrocarbon radical of at least two carbon atoms, preferably at least four carbon atoms to provide better flexibility of cured product. Adipic, azelaic and isophthalic dihydrazide have been used with particularly good effect. When isophthalic dihydrazide is used, the composition preferably contains a small amount of dicyandiamide. The novel powder preferably includes a catalyst for accelerating the rate and/or reducing the temperature required for the reaction between the hydrazide and the polyglycidyl ether. A tertiary amine such as 2,4,6-tris(dimethylaminomethyl)phenol is preferred. Also useful are organometallic salts such as stannous octoate and organo-substituted phosphines such as triphenyl phosphine. With or without catalyst, a temperature of 175°–250°C is useful for curing the deposited powder.

The novelty in the epoxy resin composition of the present invention is that it contains at least 15% by volume of barium sulfate and/or calcium carbonate, up to one-third of which may be substituted by mica powder. Although each of these fillers has often been used in epoxy resin compositions, it is surprising that this particular combination of polyglycidyl ether, dihydrazide plus the indicated amount of these particular fillers would provide the desired combination of properties discussed above which had eluded the prior art.

To accentuate the surprise, it should be noted that it is only in combination with a dihydrazide curing agent that the objectives of this invention have been attained and that these objectives have not been realized when other commonly used fillers such as silica, aluminum silicate or titanium dioxide have been substituted. However, such other fillers may be present in the novel epoxy resin compositions as long as the barium sulfate and/or calcium carbonate or mixtures thereof with up to one-third by volume of mica are present in an amount providing at least 15% by volume of the total composition, as noted above. Realizing that any pigments and thixotropic agents that may be present are also fillers, it would be difficult to employ as much as 30% filler by volume without encountering a resin-starved composition. About 25% filler by volume may be a practical upper limit for commercial-size production. Furthermore, better toughness and flexibility of cured coatings are attained if the total filler does not exceed 25 volume percent. The total filler exclusive of barium sulfate and calcium carbonate should not exceed about 12 volume percent.

The novel epoxy resin composition preferably includes a flow control agent so that when the powder fuses onto an article to be protected, a more uniform coating is obtained.

TESTING

Except as otherwise indicated below, the epoxy resin compositions of this invention were tested as follows. To prepare specimens for these tests, a steel panel or bar which has been sandblasted and then degreased is preheated in an oven to about 230°C. Powder is blown onto the panel and fuses to provide a coating of 0.2 to 0.3 mm in thickness which is cured by residual heat in the steel without any postheating, except that the panels for the Boiling Water Test were returned to the oven for 3 minutes because they did not hold sufficient heat to cure the resin.

BOILING WATER TEST

Coated steel panels measuring 7.5 × 7.5 × 0.3 cm are placed in boiling water, removed periodically, cooled to room temperature for testing and immediately returned to the boiling water if they have not failed. If the test continues for many days, the water becomes discolored from rust and is periodically replaced in order to permit observation of the test specimens. Failure is determined by attempting to cut and scrape away any part of the coating with a sharp knife. Any epoxy-dihydrazide coating which has not failed within 24 hours has always withstood this test indefinitely.

R.T. CATHODIC DISBONDMENT TEST

In a coated steel panel measuring 15 × 15 × 1 cm, a hole 3 mm in diameter is drilled through the coating and part way into the panel. A piece of 10-cm plastic pipe is adhesively bonded to the coating to provide a fluid-tight container with the hole at the center of the flat base of the container. The container is filled with an aqueous solution of 1% NaCl, 1% $Na_2SO_4$ and 1% $Na_2CO_3$. A voltage of 1.5 DC is applied between the steel panel and a platinum electrode immersed in the solution to provide cathodic protection. After 30 days, the solution is poured off, and any disbonded resin is scraped away with a sharp knife, leaving an uncoated circle, the diameter of which is measured. One epoxy resin powder of the prior art which provides tough coatings and is widely used commercially for pipe coating experiences a disbondment in the range of 20–40 mm.

60°C CATHODIC DISBONDMENT TEST

This test is run in the same way as the R.T. (room temperature) Cathodic Disbondment Test except that the test is carried out in an oven at 60°C at 6 volts DC, and the test is discontinued at 7 days. Coatings of the same commercially successful epoxy resin powder of the prior art experience total disbondment in this hot-service test.

BEND TEST

A coated steel bar 17.5 × 2.5 × 1.0 cm is bent in the easy direction around mandrels of successively smaller radii, and after each bending, the electrical insulating integrity of the coating is tested. While the coating is wet with tap water, 1,500 volts DC are applied across the coating using an electrode which is moved over the full coated surface except at the edges. The aforementioned commercially successful epoxy resin powder fails in the approximate range of 10–20 pipe diameters. "X" diameters means that the radius of the mandrel is X times the thickness of the bar.

Used in the Examples 1-9 is a polyglycidyl ether of 2,2'-bis(4-hydroxyphenyl)propane (bisphenol A) having a Durrans' softening point of 88°–98°C and an epoxide equivalent of 730–840. Such an epoxy resin is presently marketed by Dow Chemical Company as "DER-663U" which designates the same resin previously sold as "SD-289." Examples 10 and 11 employ a polyglycidyl ether of bisphenol A having a Durrans' softening point of 77°–87°C and an epoxide equivalent of 550–675. Such an epoxy resin is marketed as "Epi-Rez" 5226. In examples 1 and 2, parts by weight are in pounds, and in Examples 3–11, parts by weight are in grams.

Example 1

|  | Parts by weight |
|---|---|
| Polyglycidyl ether ("DER-663U") | 70.0 |
| Flow control agent (polymerized ethyl acrylate-long chain hydrocarbon sold as "Modaflow") | 0.7 |
| Catalyst, 2,4,6-tris(dimethylaminomethyl)phenol | 0.7 |
| Chromium oxide pigment | 0.5 |
| Titanium dioxide pigment | 3.0 |
| Halogenated phthalocyanine ("Heliogen Green Toner"66–3001) | 0.1 |
| Barium sulfate (National Lead "Foam A") | 84.0 |
| Azelaic dihydrazide | 5.4 |

With the hot roll of a 2-roll rubber mill at 50°C and the cold roll at 5°C, the polyglycidyl ether was banded on the mill, and all ingredients other than the dihydrazide were immediately added. After 5 minutes the dihydrazide was added and at nine minutes the composition was sheeted off and cooled. The composition contained about 22.5% barium sulfate by volume and about 23.5% total filler by volume.

The composition was pulverized and then dry blended with one part of fumed silica ("Cab-O-Sil"). The blend was passed through 80-mesh screen (177-micron openings) to provide a powder which was used to coat 15-cm steel pipe which had a thickness of 0.65 cm so that preheating to 230°C was sufficient to cure the resin without post-heating. The pipe was cut into pieces 17.5 cm along the length of the pipe and 2.5 cm wide. Two pieces, one of which had been bent to 30 diameters without failure of the coating, have been submersed in boiling water for more than 1 year without any evidence of disbondment.

Four panels subjected to the above-described R. T. Cathodic Disbondment Test exhibited an average disbondment of 14 mm.

A 90-cm steel pipe, 1.03 cm thick, was cleaned by bombardment with steel powder, 90% of which was angular particles which passed through a screen having 0.71 mm openings and 10% of which was rounded particles passing 1.19 mm openings. The cleaned pipe was preheated to 230°C, coated with the powder and cut into panels 15 cm square. In the 60°C Cathodic Disbondment Test, three panels showed an average disbondment of 46 mm.

At least 10 panels prepared in the same way as for the Boiling Water Test were subjected to the Gardner Impact Test at 160 inch-pounds without any failures.

EXAMPLE 2

An epoxy resin composition was prepared essentially as in Example 1 except that 36 parts by weight of barium sulfate were used plus 28 parts by weight of calcium carbonate ("Gama-Sperse" 255). The composition contained a total of 22.5% barium sulfate and calcium carbonate by volume.

| | |
|---|---|
| Boiling Water Test | 24 hours |
| Bend Test failure | 20 diameters |
| R.T. Cathodic Disbondment Test (average of 3) | 18 mm |
| 60° Cathodic Disbondment Test (average of 2) | 18 mm |
| Gardner Impact Test (160 inch-pounds) | passed |

Examples 3–8

| Ingredients in parts by weight | 3 | 4 | 5 | 6 | 7 | 8 |
|---|---|---|---|---|---|---|
| Polyglycidyl ether (Dow SD-289) | 150 | 150 | 150 | 150 | 150 | 150 |
| Flow control agent ("Modaflow") | 1.5 | 1.5 | 1.5 | 1.5 | 1.5 | 1.5 |
| Barium sulfate ("Foam A") | 0 | 32 | 68 | 108 | 153 | 204 |
| 2,4,6-tris(dimethylamino-methyl)phenol | 1.5 | 1.5 | 1.5 | 1.5 | 1.5 | 1.5 |
| Azelaic dihydrazide | 11.6 | 11.6 | 11.6 | 11.6 | 11.6 | 11.6 |
| % Filler by weight | 0 | 16 | 29 | 40 | 48 | 55 |
| % Filler by volume | 0 | 5 | 10 | 15 | 20 | 25 |
| Bend Test failure (diameters) | — | — | — | 10 | 10 | 25 |
| Boiling Water Test failure (hours) | 2 | 2 | 5 | >1400 | >1400 | >1400 |
| R.T. Cathodic Disbondment Test (average of 2 in mm) | 33 | 33 | 32 | 27 | 21 | 16 |

The panels on which the Boiling Water Test was run were first subjected to the Gardner Impact Test at 160 inch-pounds. Two panels of each of Examples 3–8 were tested and of these, one panel of Example 7 failed. One of each set of the panels which has passed was used for the Boiling Water Test.

EXAMPLE 9

A composition was made essentially as in Example 6 except that only 10 volume percent of barium sulfate was used and 5 volume percent mica powder ("4X") was added. In the Boiling Water Test, good adhesion was retained after several days, at which point the test was discontinued.

Example 10

| | Parts by weight |
|---|---|
| Polyglycidyl ether ("Epi-Rez" 5226) | 190 |
| Flow control agent ("Modaflow") | 1.4 |
| Catalyst, 2,4,6-tris(dimethylamino-methyl)phenol | 1.5 |
| Isophthalic dihydrazide | 11.6 |
| Dicyandiamide | 2.9 |
| Barium sulfate ("Foam A") | 148 |
| % Filler by weight | 41.5 |
| % Filler by volume | 16 |
| Boiling Water Test failure (hours) | >24 |
| R.T. Cathodic Disbondment Test (mm) | 7.5 |

The panel on which the Boiling Water Test was run was first subjected to the Gardner Impact Test at 160 inch-pounds without failure.

EXAMPLE 11

The "Foam A" barium sulfate used in the preceding examples had an average particle size of 6 micrometers. Example 10 was repeated, first replacing the "Foam A" with barium sulfate having an average particle size of 3.5 micrometers (National Lead "X 10 R") and then with barium sulfate having an average particle size of 1.75 micrometers ("X 5 R"). In the Boiling Water Test, the panel made using the 3.5-micrometer particles failed at 4 hours whereas the panel made using the 1.75-micrometer particles retained good adhesion after 24 hours. It is not understood why the panel failed, and this test result is considered an anomaly. It is believed that there is little significance in the particle size of the filler except that the epoxy resin would not as readily wet high proportions of very small particle sizes (e.g., 25 volume percent of the filler at below 1 micrometer average). Filler particles averaging more than about 20 micrometers would be impractical. As is well known in the art, epoxy resin powders have a preferred average size of 5–100 micrometers for use in coating metal such as pipe.

In the R. T. Cathodic Disbondment Test, a panel coated with the composition containing 1.75-micrometer barium sulfate exhibited a value of 10.5 mm.

I claim:

1. An epoxy resin composition that can be pulverized to provide a free-flowing powder which is shelf-stable and when heated to 175°–250°C in contact with a metal article temporarily softens and then gels and cures to provide a tough protective coating, said composition comprising a homogeneous blend of a polyglycidyl ether of polyhydric phenol having a softening point of 70°–120°C, 0.6–1.5 equivalents per epoxide equivalent of the polyglycidyl ether of a dihydrazide of the formula

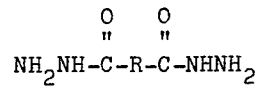

wherein R is a divalent hydrocarbon radical of at least two carbon atoms, and filler in an amount providing up to 30% by volume of the cured protective coating, of which filler barium sulfate, calcium carbonate and mica provide at least 15% by volume and barium sulfate and calcium carbonate provide at least 10% by volume of the cured coating,
which protective coating is characterized by exceedingly good resistance to loss of adhesion upon prolonged exposure to boiling water.

2. An epoxy resin composition as defined in claim 1 and comprising at least 15% barium sulfate and calcium carbonate by volume.

3. An epoxy resin composition as defined in claim 2 and comprising 15–25% barium sulfate by volume.

4. An epoxy resin composition as defined in claim 2 and comprising 15–25% calcium carbonate by volume.

5. An epoxy resin composition as defined in claim 1 wherein R is a divalent hydrocarbon radical of at least four carbon atoms.

6. An epoxy resin composition as defined in claim 1 wherein the polyglycidyl ether is a polyglycidyl ether of bisphenol A.

7. In an epoxy resin composition comprising a homogeneous blend of a polyglycidyl ether of polyhydric phenol having a softening point of 70°–120°C, a dihydrazide of the formula

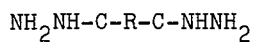

wherein R is a divalent hydrocarbon radical of at least two carbon atoms, and filler in an amount providing up to 30% by volume of the composition, the improvement comprising at least 15% by volume of the composition is
  barium sulfate,
  calcium carbonate,
  a mixture of barium sulfate and calcium carbonate, or
  a mixture of barium sulfate and/or calcium carbonate with mica powder, of which mixture barium sulfate and calcium carbonate comprise at least 10% by volume of the composition,
which composition provides cured protective pipe coatings affording exceedingly good resistance to prolonged exposure to boiling water.

* * * * *